United States Patent [19]
Smith

[11] 3,904,156
[45] Sept. 9, 1975

[54] EXTERNAL LOAD STABILIZATION APPARATUS

[75] Inventor: James H. Smith, Springfield, Pa.

[73] Assignee: The United States of America as represented by the Secretary of the Army, Washington, D.C.

[22] Filed: July 11, 1974

[21] Appl. No.: 487,837

[52] U.S. Cl.................... 244/118 R; 244/3; 212/11
[51] Int. Cl.² ........................................ B64D 9/00
[58] Field of Search....... 244/1 TD, 3, 17.11, 17.13, 244/17.15, 77 D, 118 R, 137 R; 294/81 R, 81 SF, 67 R; 212/8 R, 8 A, 10, 11, 14, 20, 21, 18, 125, 126, 131

[56] References Cited
UNITED STATES PATENTS

| | | | |
|---|---|---|---|
| 2,517,830 | 6/1970 | Virkkala | 212/10 X |
| 2,806,610 | 9/1957 | Goertz | 212/21 R X |
| 2,873,075 | 2/1959 | Mooers et al | 244/17.13 |
| 3,554,468 | 1/1971 | McVicar | 244/137 R |
| 3,601,342 | 8/1971 | Piasecki | 244/137 R |
| 3,602,375 | 8/1971 | Martinson | 212/14 |
| 3,743,107 | 7/1973 | Verschoof | 212/10 X |
| 3,756,543 | 9/1973 | Fowler et al | 244/17.13 X |
| 3,838,836 | 10/1974 | Asseo et al | 244/137 R |

Primary Examiner—Trygve M. Blix
Assistant Examiner—Galen L. Barefoot
Attorney, Agent, or Firm—Nathan Edelberg; Robert P. Gibson; Norman L. Wilson, Jr.

[57] ABSTRACT

In the history of helicopters and similar aircraft carrying cargo externally, a need has been established for an effective load stabilization system. The apparatus provided herein not only improves external load modal damping, provides the pilot command control augmentation of the load, and minimizes pilot induced oscillation, but is universally adaptable to a wide variety of helicopters. The apparatus contemplates rigid pendants which damp load motion in response to a sensor.

13 Claims, 9 Drawing Figures

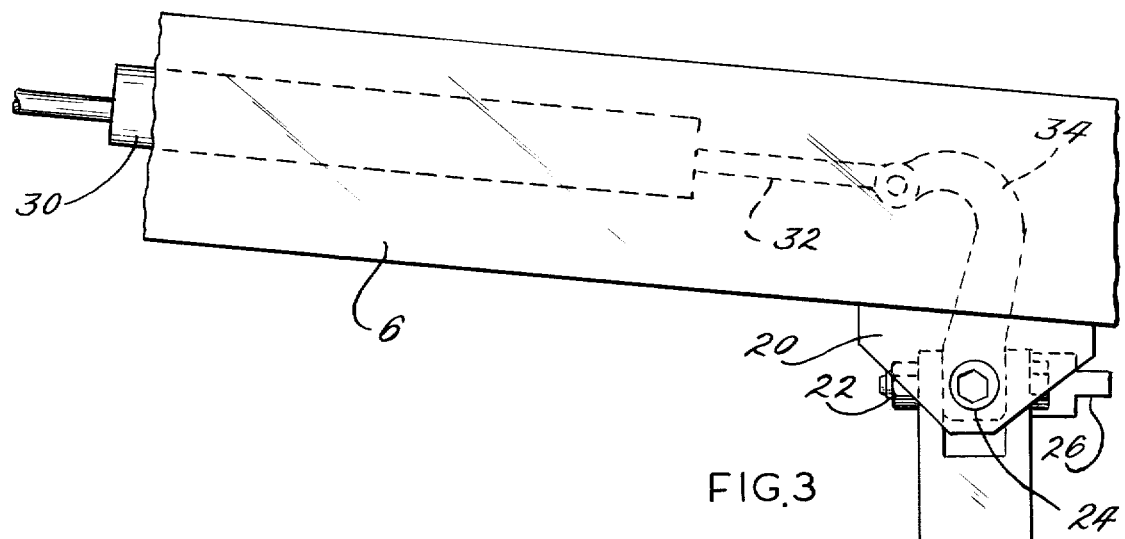
FIG.3
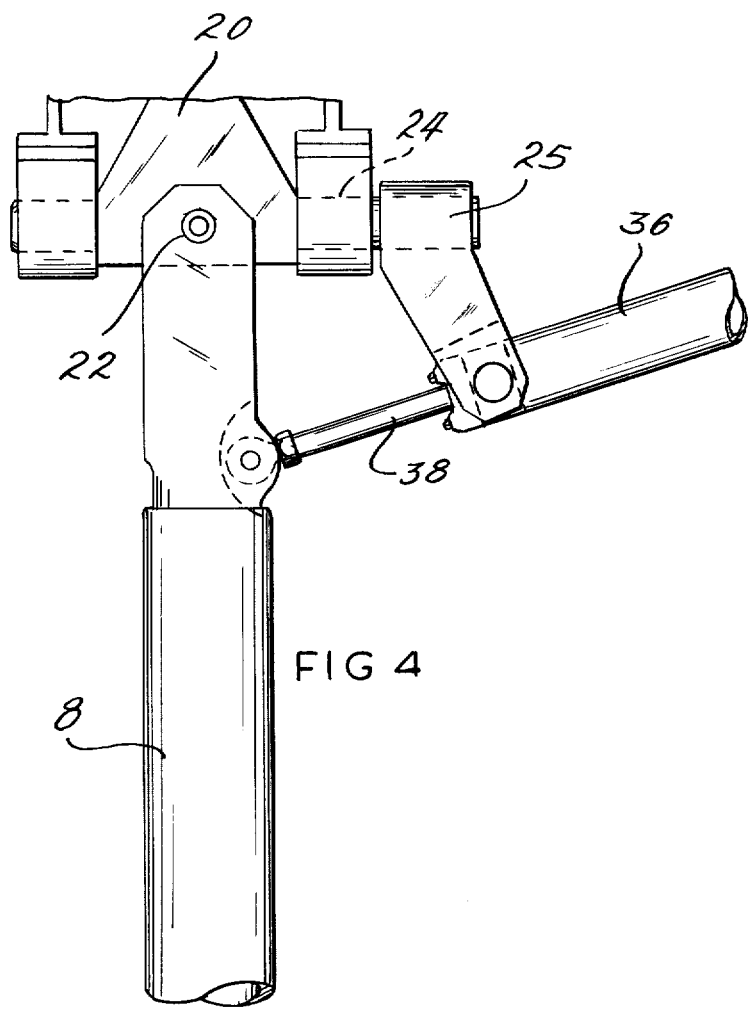
FIG 4
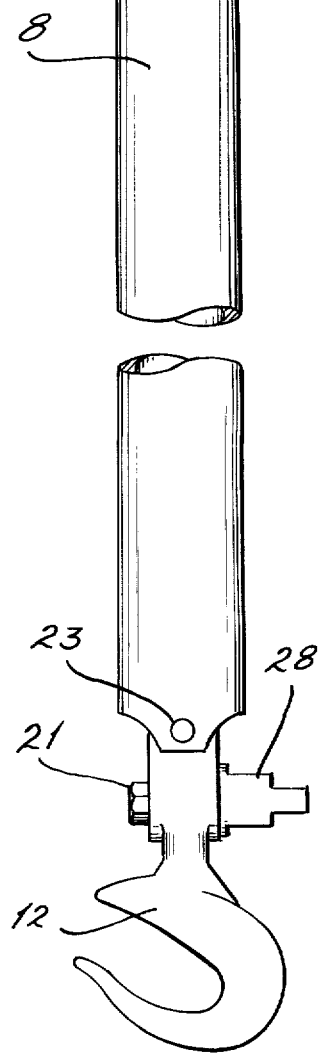

EXTERNAL LOAD STABILIZATION APPARATUS

BACKGROUND OF THE INVENTION

This invention pertains to improvements in load carrying apparatus of the cargo type external of an aircraft. More particularly the invention relates to means for stabilizing loads which are lifted and carried beneath aircraft, especially helicopters.

In external cargo carrying, single or multiple point suspension cargo slings are attached to the underside of the aircraft fuselage. The external cargo sling assembly, hence, usually includes one or more riser arms or cables, generally positioned relative to the center of gravity of the helicopter or other aircraft. The end of the arm away from the fuselage desirably is provided with a cargo hook to which one or more support cables from a load container are attached.

Initially, helicopter cargo delivery was accomplished using a single-point cargo hook system. The CH-47 is a typical example. This system allows visual flight rules flight with high-density loads such as ammunition stacks, artillery pieces, or petroleum products. However, "low" density loads, such as an empty MILVAN, encounter aerodynamic instability which causes large and uncontrolled motions of the load. On single-point sling rigging, an empty 8 × 8 × 20-foot MILVAN limits helicopter airspeed to approximately 40 knots. Beyond that speed, load motions interfere with the control of the helicopter. The poor cargo handling economics resulting from this speed restriction has focused attention on improving productivity and aircraft utilization. One such solution was the dual tandom cargo hook suspension with its directional restraint of the load. However, this mechanism does not impart an increase in damping. Thus in the history of helicopters carrying cargo externally, a need has been established for an effective load stabilization system, to improve load placement capability, and to increase aircraft productivity and safety. In actual fact, even with a dual hook most of the commonly-transported external loads exhibit poor dynamic stability, arising from an aerodynamic static instability of the load or poor hover stability due to the lack of inherent damping. These dynamic instabilities, or slightly damped motions, are manifested during flight operations and are known to cause such cargo handling operational limitations as: restriction of the maximum airspeed to a value below the power-limited airspeed due to the promotion of large-amplitude load displacements; excessive time requirements for accurate positioning or placement of the load; and degradation of operations by introducing disorienting or false motions cues to the pilot. It can be seen that the overall result of load instability or low damping is a usable operational capability which is less than the inherent performance potential of the helicopter system.

A variety of load stabilization systems have been considered in the past in order to reduce or eliminate the undesirable dynamic instabilities of externally-slung loads. Among these are the addition of load stabilizing appendages such as drogues (U.S. Pat. No. 2,953,330) and fins, special load suspension rigging arrangements (U.S. Pat. No. 3,044,818) and the automatic control of the helicopter itself. Each of these solutions is, in some measure, limited to a particular load geometry or a particular helicopter. As such, the solutions are not well suited for general application. As an example, most appendage additions are generally tailored for specific external loads (U.S. Pat. No. 3,554,468), arrangements being designed for selected vehicles as well as loads. Automatic load control by means of the helicopter itself generally involves a control subsystem designed for application to one specific air vehicle.

One of the problems encountered in the use of cargo load carriers of the type which are suspended beneath an aircraft by means of risers is that of yawing and of unrestricted lateral and longitudinal movement. Yawing can be controlled by various immobilization means such as that shown in U.S. Pat. No. 3,044,818 and British Pat. No. 1,307,769. However, immobilization of the entire system defeats the purpose of external load handling. The most satisfactory solution to the instability problem, therefore, involves damping the load motion. U.S. Pat. No. 3,756,543 relates to automatic load stabilization. The helicopter is tilted in a direction to cause it to move over the load. This tilting motion, generally time delayed with respect to the simple pendular motion of the load, is adjusted by utilizing the rate of change of the angle between the support cable and the vertical, and the lag of that rate so as to cause a corrective motion of the aircraft to damp out the pendular motion of the load. The motion of the aircraft thus tends to damp the kinetic energy of the load.

SUMMARY OF THE INVENTION

In accordance with this invention, means are provided for achieving the necessary load damping without imposing excessive power requirements on the helicopter. A stabilization mechanism is provided for cargo load carriers of the type which are suspended beneath an aircraft by means of risers by which the load pendular damping factor is increased from a value of 0.05 to 0.3. Arm support means are positioned in the base of the aircraft, and a pair of retractable load-carrying arms (load arms) are supported in universal joint means positioned with the load arm support means so that the two load arms become pivotally connected spaced pendants. Load arm drive means are adapted to move each load arm within its universal joint means both longitudinally and laterally relative to the aircraft. Riser attachment means are pivotally connected to the lower end of each load arm and adapted to receive and move linearly with a riser attached both thereto and to the load carrier. In a disturbed mode, the arm and cable angular positions are sensed by sensor means, and a corrective control signal is sent electronically to actuators which damp the load motion by moving the load arms to which are attached the flexible risers and the load.

DETAILED DESCRIPTION OF THE INVENTION

An important forward step in external load stabilization was the dual tandem cargo hook system. Nevertheless, even with its tremendous potential, the dual hook system still imposes certain limitations due to its low damping levels. Risers can be separated to reduce yaw oscillations. However, full instrument flight operations are limited by longitudinal pilot induced oscillations. Longitudinal and lateral oscillations also present problems particularly in hover for load placement and the like. Longitudinal motion is defined as fore and aft swing of the load, lateral motion as the sideward swinging and yawing as the directional motion of the load.

The mitigation of yawing and the damping of lateral and longitudinal load oscillations by the apparatus of

3 this invention can best be understood from a detailed description of the invention with reference to the accompanying drawings.

FIG. 3 is an elevational showing of a load arm showing load arm actuating means for longitudinal damping.

FIG. 4 is a similar view showing load arm actuating means for lateral damping.

Figure 1:
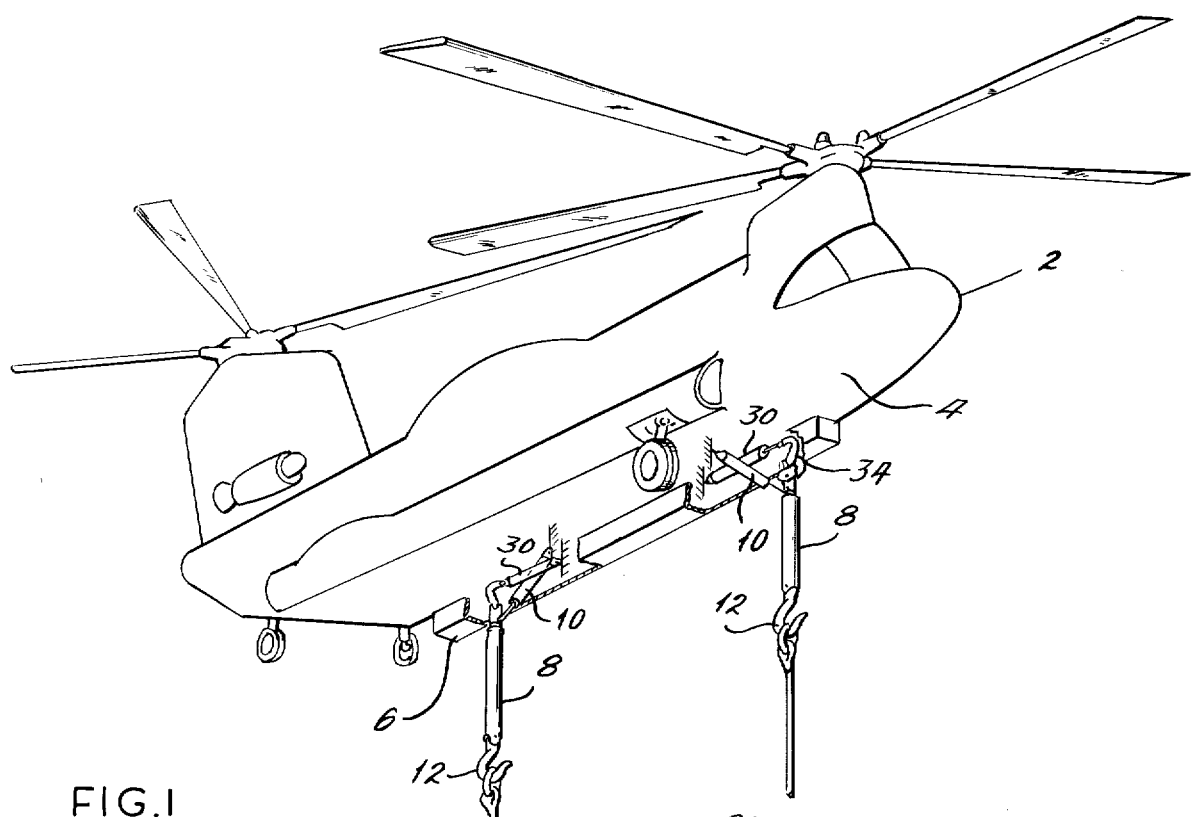
FIG. 1 is a perspective view showing the entire invention and its relation to a helicopter.

Referring to FIG. 1, an aircraft in the form of a helicopter 2 includes fuselage 4 to which a load arm support means is attached. A desirable load arm support means is a modified dual-hook load beam 6 which contains most of the control hardware, and is attached to the airframe. Mounted at the extremities of beam 6 are two rigid load-carrying arms (load arms) 8. The upper ends of these arms 8 are attached to beam 6 by means of pillow-block type universal joints 20 with coincident pitch and roll axes, the load arms thus becoming pivotally connected spaced front and rear pendants.

Figure 2:
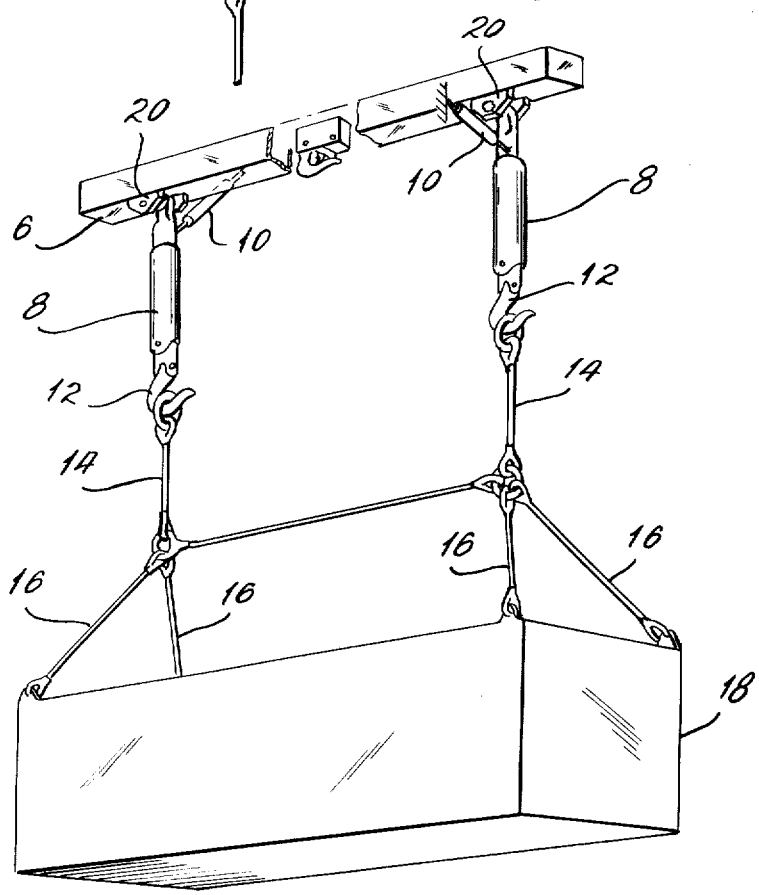
FIG. 2 is a similar view without the helicopter, showing the apparatus in greater detail.

FIG. 2 shows the general arrangement of an arm 8 in its normal operating position. The longitudinal actuator is housed with the beam as will be described to drive the load arm about a pivot in the pillow-block on the bottom of the beam. The lateral actuator 10, which is predominate in this view drives the load arm about a pivot at the upper end of the arm. Since the lateral actuator rotates on the longitudinal axis, it stays in plane with this pivot. There is, therefore, no interaxis coupling (that is, no longitudinal motion with lateral actuator stroking). Likewise there is no lateral coupling with longitudinal actuator motion. At the arm's lower end, a cargo hook 12 is provided to receive risers 14 to which a load is attached by means of cables 16, the load in this instance being carrier 18. At the hook, the upper pivot provides longitudinal freedom. Cargo hook 12 also has a cam attached thereto to hold the hook up when the arm is retracted.

The load arm is shown in greater detail in its normal operating position in FIG. 3. The pillow-block type universal joints 20 are clearly illustrated in this view which shows pivots or shafts 22 and 24 of joint 20. At the arm's lower end, a similar joint, including shafts 21 and 23, is shown. The sensor means are also shown in FIG. 3. Cylinders 26 and 28 each contain, respectively, arm and riser angle synchro signal transmitters which are actuated by their respective arm or hook pivotal movements. Two additional synchro signal transmitters for the longitudinal axis are mounted on the back side of links 23 and 24. These are not visible in FIG. 3. FIGS. 3 and 4 taken together show the load arm actuating means adapted to engage and operate each load arm to move the load arms longitudinally and laterally. Longitudinal operation is effected by hydraulic cylinder 30 and drive means such as piston rod 32 and drive arm 34. Similarly, lateral operation is accomplished by hydraulic cylinder 36 and piston rod 38. The relationships of two hydraulic cylinders is apparent from FIG. 1. It will be obvious from FIG. 4 that when arm 8 is moved longitudinally, i.e. about linkage 24, hydraulic cylinder 36 rotates therewith in view of its connection 25.

Figure 5:
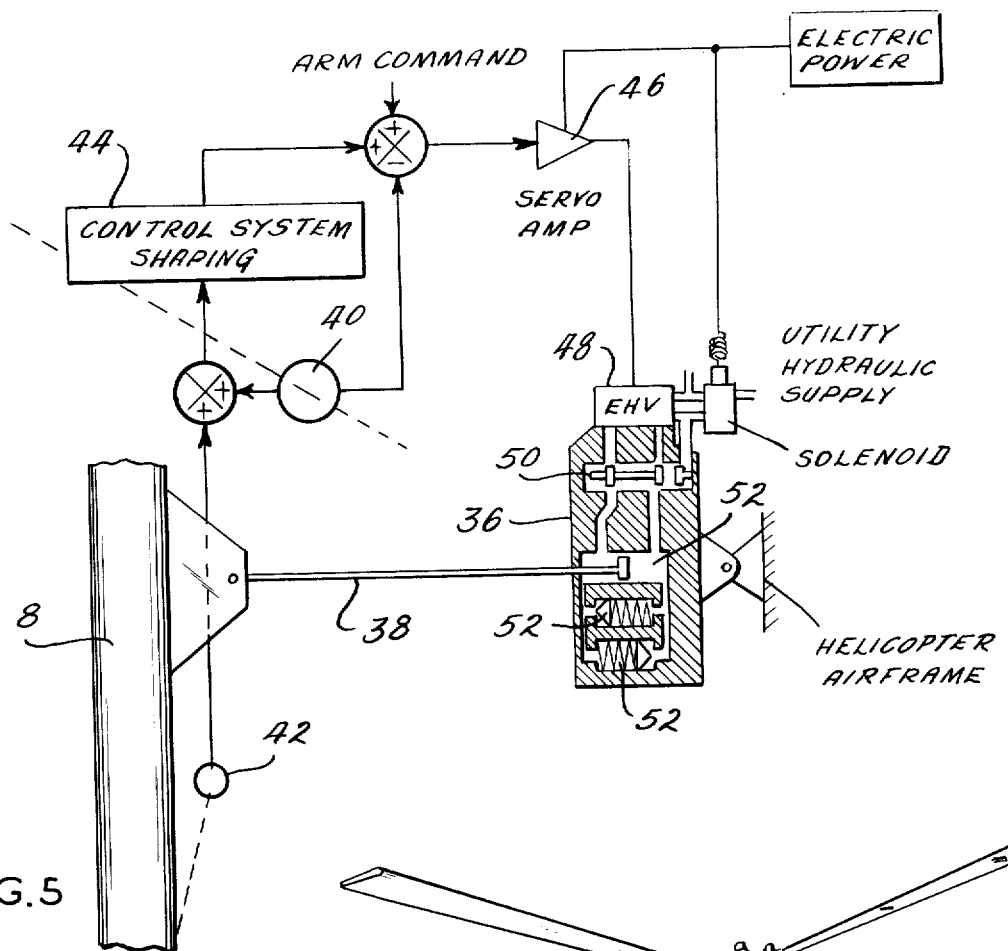
FIG. 5 is a view, partially in cross-section, showing in detail how the load arms are driven.

The operation of the hydraulic cylinders will be understood from FIG. 5 wherein a cross section of hydraulic cylinder 36 is shown. FIG. 5 presents a typical actuator control servo loop system and the associated components used to manipulate the arms or pendants. As can be noted from this figure, rotary synchros 40 and 42 provide a measure of the position of arm 8 and the cable angle relative to the arm, with respect to a given axis system (i.e., decoupled longitudinal and lateral angles). The respective angles are electronically summed and appropriately shaped using the control system shaping 44. This processed, electronic signal is then fed into the servo amplifier 46 which actuates the electrohydraulic valve (EHV) 48. Additional pendant command inputs (e.g., feed forward) can be fed through another summing device into the servo amplifier to command the pendant/load motion into the direction of helicopter motion.

The combined electrical circuitry with the servo amplifier 46 and EHV 48 constitute the entire pendant position servo system. The hydraulic fluid is forced through EHV 48 and a bypass valve 50 into the actuator chamber 52 to activate the actuator arm 38 which in turn moves arm 8 to provide the required load damping. Bypass valve 50 is used to free arm or pendant 8 when the system is turned off, through a loss of electrical or hydraulic power, or by a normal shut-off. Two relief valves 52 are also incorporated in the actuator so that during normal operation any momentary hydraulic lock, due to closing of EHV 48 (overpressure), will be vented, and thus overpressure design limits of the actuator will not be exceeded.

Figure 6:
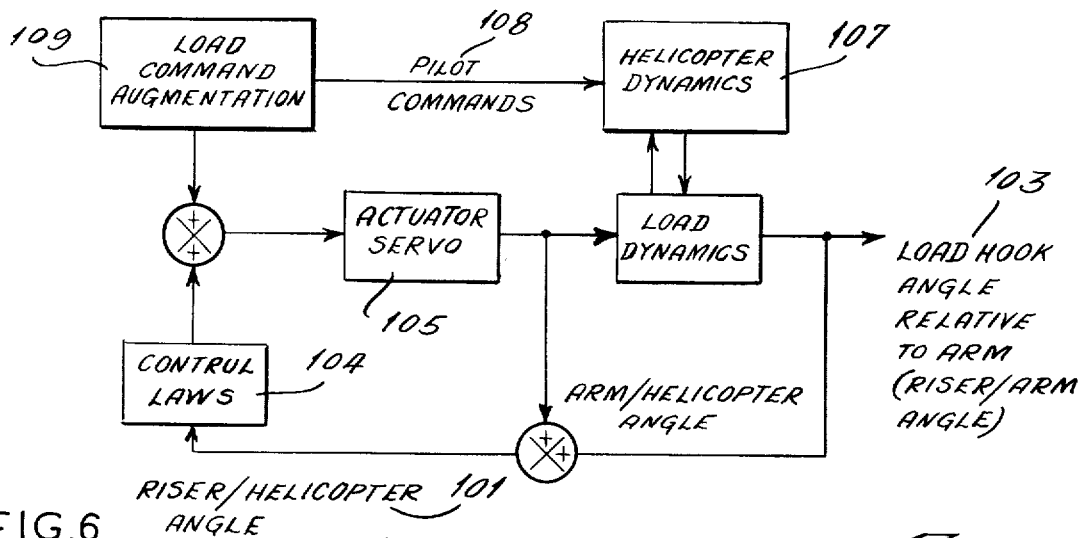
FIG. 6 is a general control block diagram.

Having described the invention in terms of its components, the details of its operation will now be given. In a preferred embodiment, the prime signal used to effect load pendular damping is the angle of the riser with respect to the helicopter airframe (noted in FIG. 6 as point 101). This signal is formed by summing the arm position 102 and angle of the riser relative to the arm 103. See angles $A_f$, $A_a$ and $B_f$, $B_a$ in FIG. 7. The control dynamics, termed control laws 104 herein, provide processing or shaping of the signal to obtain the desired damping, and this signal in turn commands the actuator servo 105. The actuator servo, which converts the electrical signal to an arm position, is a conventional position control loop that also includes the arm synchro signal for its feedback. The external load dynamics 106 and helicopter dynamics 107 are influenced by the arm motion with one of the resultant outputs being the cable (riser) angle. The pilot commands 108 influence the helicopter and sling load via the conventional controls. Further, a command augmentation function 109 is provided for the purpose of improving load placement efficiency by forcing the load to follow the helicopter's motion. In addition to the synchro signals being summed and fed into the control law, the arm position synchro signal is also used to form the feedback of the actuator position servo. Other elements of this position servo are the amplifier, electrohydraulic valve, and the actuator (piston-cylinder) which drives the arm.

Figure 7:
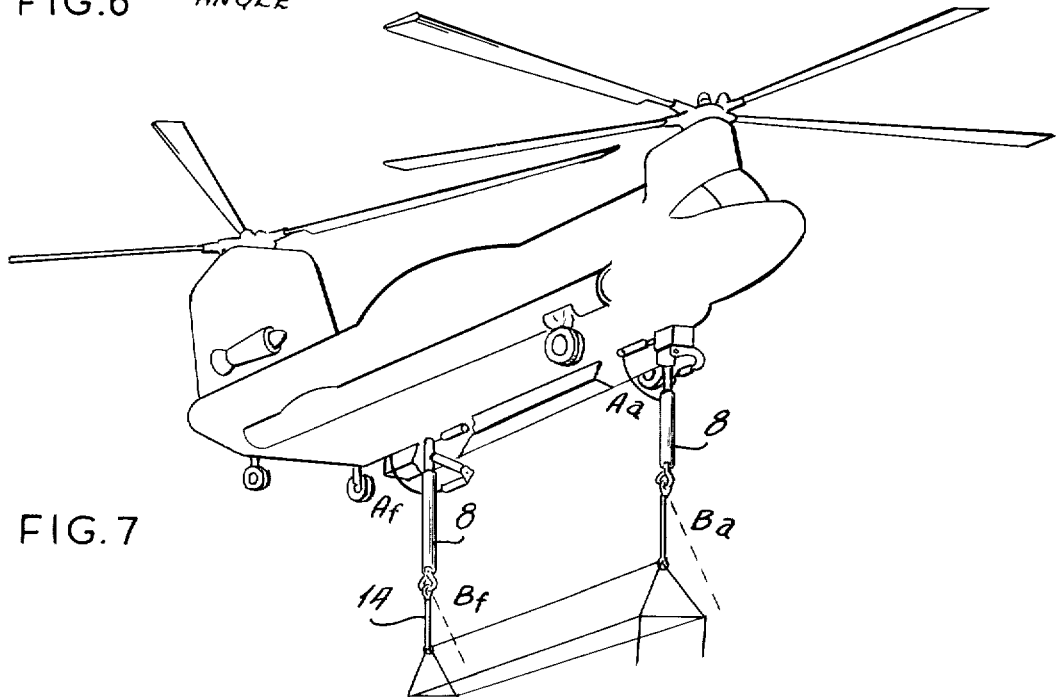
FIG. 7 is a sketch showing the pertinent angles.
Figure 8:
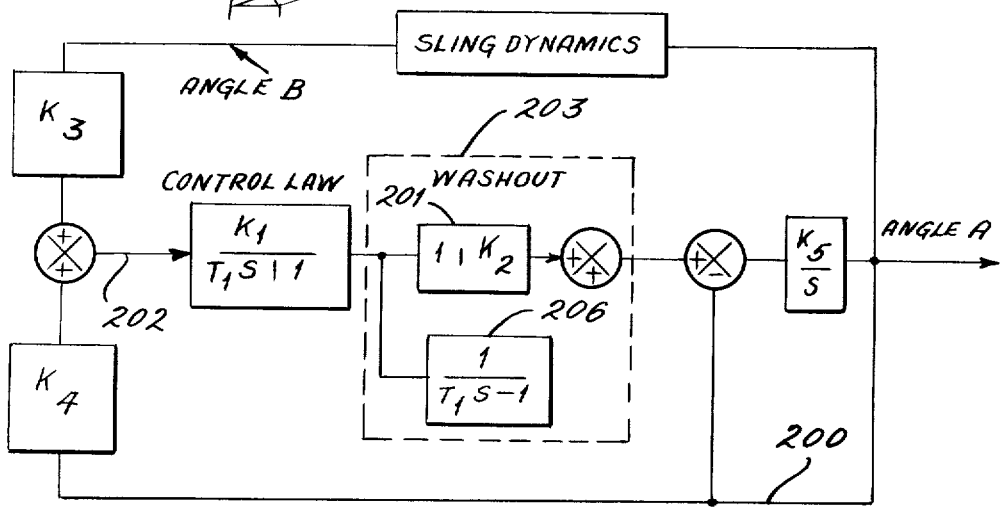
FIG. 8 is a schematic block diagram.

Operation of the preferred embodiment is shown in greater detail in FIGS. 7 and 8. FIG. 8 shows a block diagram and FIG. 7 shows a simplified sketch of the rigid arm angles $A_f$ and $A_a$, (angle A), external load mass, and connecting sling (relative riser angle $B_f$ and $B_a$ (Angle B). Stabilization is obtained by changing the arm angle (A) in response to the sensed sling motion through the control system, thus dissipating the kinetic energy or damping the harmonic motion of the load. Broadly the arm is commanded to move over the load or in the direction of the load swing, but with a specific time lag. This lowers the pendulum frequency due to the increased effective pendulum length. Because of the arm time lag, the sling decelerates the motion. In both the longitudinal and lateral modes, the front and rear arm movements are identical (or in parallel). When damping a directional mode of the external load motion the arms move differentially in lateral axes. The block diagram details the elements in the stabilization control system. The arm position servo, linear transducer 200, with its output the arm (angle A) is noted. With high gain (5.0) this position servo has minor effect on the system. The arm angle (A) and riser (B) are summed and then processed through lag circuit 202 of the control law. The control law is a simple lag filter, i.e. $1/(\tau S+1)$ where $\tau$ is the time constant and $S$ is the Laplacian operator, combined with a gain $K_1$, usually set at an amplification factor of 10. The time lag is normally around 2.0 seconds. Washout Unit 203 is not needed for damping, but is necessary to realign the arm over long periods of time. In the longitudinal axis amplifier 201 and lag circuit 206 are adjusted so that riser angle B ($B_f$ or $B_a$) will tend toward zero. The arm will thus track a trailing load during high airspeed operations. These parameter settings work well to provide damping in any longitudinal, lateral or direction modes.

The effect of time constant ($\tau$) variation at a constant gain has been explored, and if the time constant is short, say 0.3 second, the control law forces the arm rapidly over the load. The net result is only a lowered sling frequency, with little damping effect. If at the other extreme, the time constant is excessive, say 10 seconds, the arm is sluggish or remains nearly fixed, also resulting in a basically undamped sling motion. Desirable time lags are in the range of 1.3 to 5 seconds, the preferred damping ($\xi$=0.33) being obtained at a 2.0 second lag time constant. Gains $K_3$ and $K_4$ in amplifiers 204 and 205 are unity and must be held within about 5 percent in order to maintain best system dynamics. It can be seen that the loop parameters described are sufficient in themselves to provide damping of the load, however, additional feed-forward commands can be inserted at point A. These may be desirable in precision hover systems in order to command the arms to accelerate the load in the direction of helicopter motion. Thus, except for inputs from the helicopter stick and pedals there is no electrical connection between the front and rear controller. Damping is obtained solely from the individual action of each sensed angle, driving the arms as required by the control dynamics.

Considering now a specific example, the apparatus shown in FIG. 2 was fabricated with 4 ft. arms and 8 ft. risers (elements 8 and 14). Load container 18 was an 8 × 8 × 20 foot MILVAN. Both the arms and the cargo hook were fixed in yaw, but possessed longitudinal and lateral freedom. The apparatus of the invention increased the load pendular damping factor $\xi$ from a value of 0.05 to 0.3. Without a load stabilization device and with a 50 foot riser, having a 0.035 damping rate, 30 seconds were required for a disturbance to decay to half amplitude. With the load stabilization apparatus of the invention a 0.3 damping ratio can be obtained.

Figure 9:
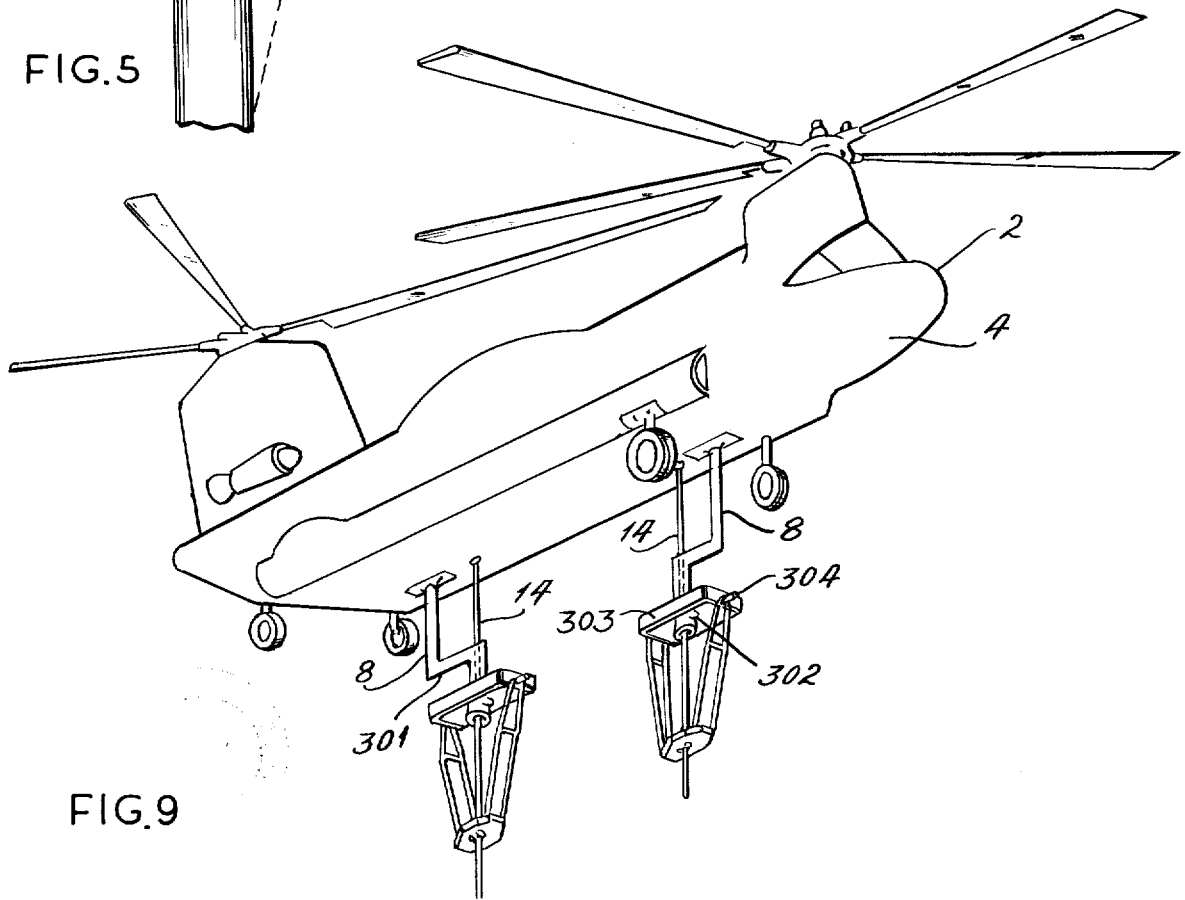
FIG. 9 is a view showing a different embodiment of the invention.

In the embodiment described arm and riser angle measurements are employed to effect load damping, position transducers or strain gauges being used. It has been found, however, that rate sensing devices can also be utilized. Damping can be accomplished by rates of change of the arm and riser angles (their derivatives with respect to time) at respective $K_3$ and $K_4$ gains. As an example of another variation FIG. 9 is given. In this embodiment riser cable 14 is attached to the base of the aircraft 4 rather than to a cargo hook, thereby passing through ferrule 300. Load arm 8 is offset because of bend 301, and is also pivotally connected to the body of the aircraft. Sensing gimbal 303 makes it possible to ascertain the riser and arm angles, being provided with lateral synchro transducer 304 and longitudinal synchro transducer 302. These and other variations will occur to those skilled in the art. Such modifications are thus deemed to be within the scope of this invention.

What is claimed is:

1. A stabilization mechanism for cargo load carriers of the type which are suspended beneath an aircraft by means of risers, comprising: load-carrying arm support means positioned in the base of the aircraft; a pair of retractable load-carrying arms (load arms); universal joint means positioned within the load arm support means, and adapted to receive the upper ends of each load arm so that the two load arms become pivotally connected spaced pendants; load arm drive means adapted to move each load arm within its universal joint means both longitudinally and laterally relative to the aircraft; riser attachment means pivotally connected to the lower end of each load arm and adapted to receive and move linearly with a riser attached both thereto and to the load carrier; sensor means engaging each load arm for sensing motion of the load arm relative to a reference line through the aircraft base, and for generating a signal as a function of said motion; sensor means engaging each riser attachment means for sensing motion of the risers relative to their respective load arms, and for generating a signal as a function of said motion; load arm actuating means adapted to engage and to operate each load arm drive means to move the load arms both longitudinally and laterally; electronic circuit means responsive to the load arm engaging sensor means and the riser engaging sensor means, transmitting corrective electrical signals to each load arm actuating means, driving the load arms to damp pendular load motion; and yaw damping means inhibiting oscillation of a load about a vertical axis through differential front and rear arm motion.

2. The mechanism of claim 1 wherein the load arm sensor means and riser sensor means sense the angles.

3. The mechanism of claim 1 wherein the load arm sensor means and riser sensor means sense the rates of change of the angles.

4. The mechanism of claim 1 wherein the electronic circuit means includes a lag filter having a transfer characteristic proportional to $1/(\tau S+1)$ where S is the Laplacian operator and $\tau$ is the time constant.

5. The mechanism of claim 1 wherein the load arm support means is a load beam carrying the pendants.

6. The mechanism of claim 1 wherein the universal joint means is a pillow-block type universal joint carried by the load arm support means.

7. The mechanism of claim 1 wherein the riser attachment means are cargo hooks.

8. The mechanism of claim 1 wherein the risers are metal rods.

9. The mechanism of claim 1 wherein arms rather than being load carrying are control arms which carry the sensor means and move load carrying risers to damp the load.

10. The mechanism of claim 1 wherein the load carrier is a sling.

11. The mechanism of claim 1 wherein load carrier is a cubical container.

12. The mechanism of claim 1 wherein the load arm drive means is a piston operated actuating rod, and wherein the load arm actuating means is an electrohydrualic valve and cylinder combination whose piston operates the actuating rod.

13. The mechanism of claim 12 wherein the electrohydraulic valve and cylinder combination includes a bypass relief valve.

* * * * *